United States Patent [19]
Rossini

[11] Patent Number: 5,596,151
[45] Date of Patent: Jan. 21, 1997

[54] PRESSURE COMPENSATING DEVICE FOR INSULATING GLASS FRAMES

[75] Inventor: Mauro Rossini, Este, Italy

[73] Assignee: Finvetro S.r.l., Este, Italy

[21] Appl. No.: 357,680

[22] Filed: Dec. 16, 1994

[30] Foreign Application Priority Data

Dec. 20, 1993 [IT] Italy ................... PD93A0246

[51] Int. Cl.⁶ .............. A47G 1/00; E04C 2/38; E04C 2/54; E06B 7/14
[52] U.S. Cl. ................... 73/861.55; 52/204.52; 52/656.6; 52/786.1
[58] Field of Search ................ 73/861.53, 861.55; 52/172, 204.52, 304, 656.6, 786.1; 49/408, 507; 76/113, 118, 132; 251/211

[56] References Cited

U.S. PATENT DOCUMENTS

| | | | |
|---|---|---|---|
| 1,703,230 | 2/1929 | Gillar | 52/209 |
| 2,071,811 | 2/1937 | Bartuska | 52/172 |
| 3,011,517 | 12/1961 | Sanford | 137/533.13 |
| 4,567,703 | 2/1986 | Ricks | 52/304 |

FOREIGN PATENT DOCUMENTS

| | | |
|---|---|---|
| 2257769 | 8/1975 | France . |
| 744858 | 7/1954 | United Kingdom . |
| 954904 | 4/1995 | United Kingdom . |

Primary Examiner—Richard Chilcot
Assistant Examiner—William L. Oen
Attorney, Agent, or Firm—Guido Modiano; Albert Josif

[57] ABSTRACT

Device for compensating pressure differences between the inside and the outside of an insulating glass frame, including a closed cylindrical hollow body which is arranged, so that its axis is not horizontal, between the inside and the outside of an insulating glass frame. A ball is movable within the body and has such a diameter as to be in contact with the wall, so as to fully separate the inside into two regions. At least one first hole for connection to the outside/inside is located in a suitable wall portion affected by the passage of the ball, and at least one second hole for connection to the inside/outside is located on the bottom.

13 Claims, 3 Drawing Sheets

PRESSURE COMPENSATING DEVICE FOR INSULATING GLASS FRAMES

BACKGROUND OF THE INVENTION

The present invention relates to a device for compensating pressure differences between the inside and the outside of an insulating glass frame caused by changes in environmental parameters.

It is known that the inside of an insulating glass frame is usually separated hermetically from the external environment.

A negative consequence thereof is the fact that the pressures of the air inside and outside the insulating glass frame are not always balanced.

Changes in environmental parameters due to weather variations in fact lead to changes in the pressure of the outside air, which becomes higher or lower than the pressure inside.

The inside of the insulating glass frame can thus be in overpressure or at a negative pressure with respect to the outside environment.

This has the observed effect of deforming the insulating glass frame so that it swells or becomes narrower, with evident aesthetically unpleasant visual effects.

The curving of the glass panes in fact changes the angles of incidence of the light in the various surface regions, with corresponding effects both on reflection and transmission.

Furthermore, if a Venetian blind is included inside the insulating glass frame, it is evident that a narrowing of the space between the panes can cause difficulties in operation.

SUMMARY OF THE INVENTION

A principal aim of the present invention is therefore to provide a device that can compensate pressure differences between the inside and the outside of an insulating glass frame when they exceed preset threshold values with respect to an initial equilibrium condition.

Another important object is to provide a compensating device that can be installed without difficulty in the structure of the insulating glass frame.

Another important object is to provide a compensating device that is simple and functional.

Another object is to provide a compensating device that can be manufactured at low cost with conventional equipment and facilities.

According to the present invention, there is provided a device for compensating pressure differences between the inside and the outside of an insulating glass frame caused by changes in environmental parameters, characterized in that it comprises a closed cylindrical hollow body which is arranged, so that its axis is not horizontal, between the inside and the outside of an insulating glass frame, a ball being movable within said body, said ball having such a diameter as to be in contact with the wall so as to fully separate the inside into two regions, at least one first hole for connection to the outside/inside being located in a suitable wall portion affected by the passage of said ball, at least one second hole for connection to the inside/outside being located on the bottom.

BRIEF DESCRIPTION OF THE DRAWINGS

The particular characteristics and advantages of the invention will become apparent from the following detailed description of some preferred embodiments thereof, illustrated only by way of non-limitative example in the accompanying drawings, wherein.

DESCRIPTION OF THE PREFERRED EMBODIMENTS

Figures 1, 2:
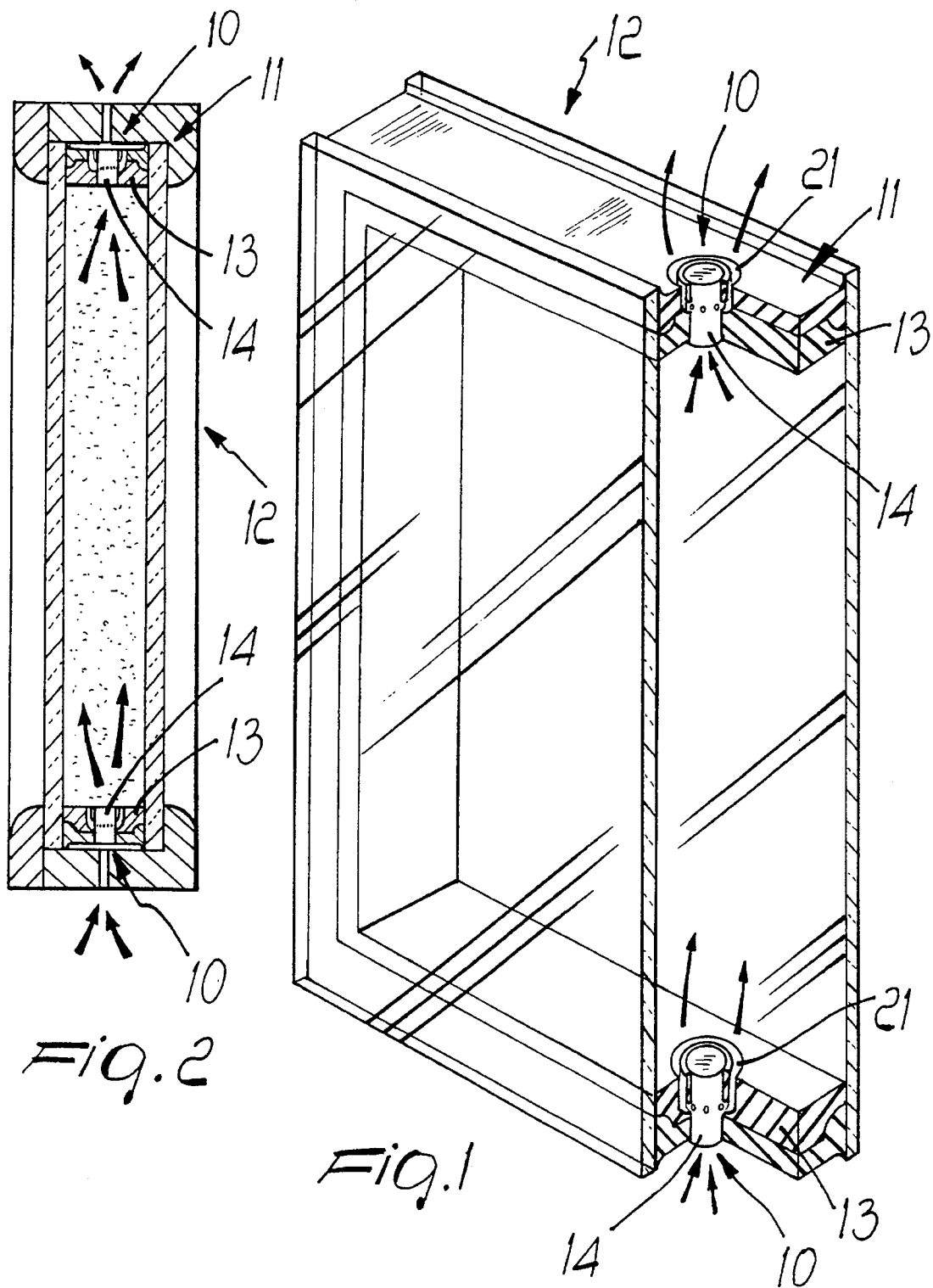
FIG. 1 is a cutout perspective view of an insulating glass frame provided with the pressure compensating device according to the present invention.
FIG. 2 is a sectional view of the insulating glass frame of FIG. 1.
Figure 3:
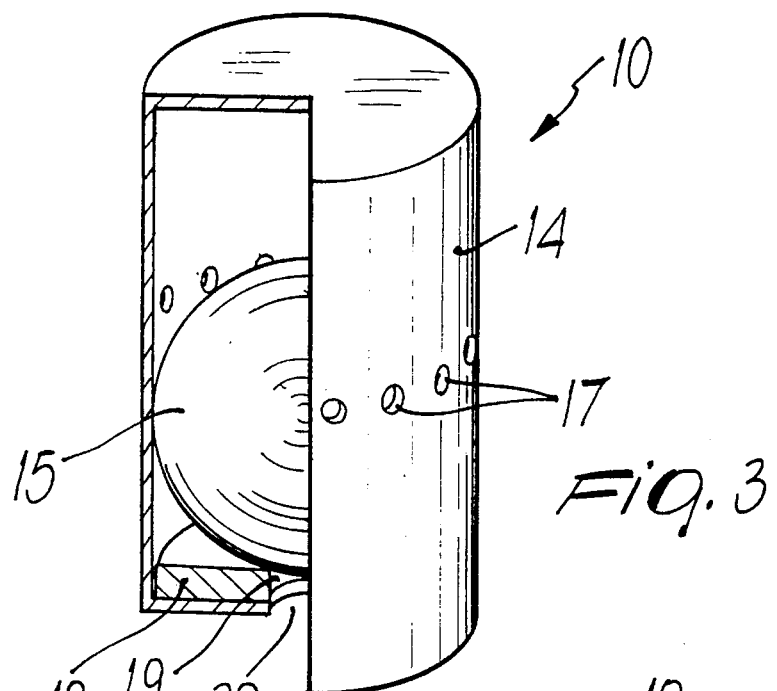
FIG. 3 is a cutout perspective view of the device.
Figure 4:
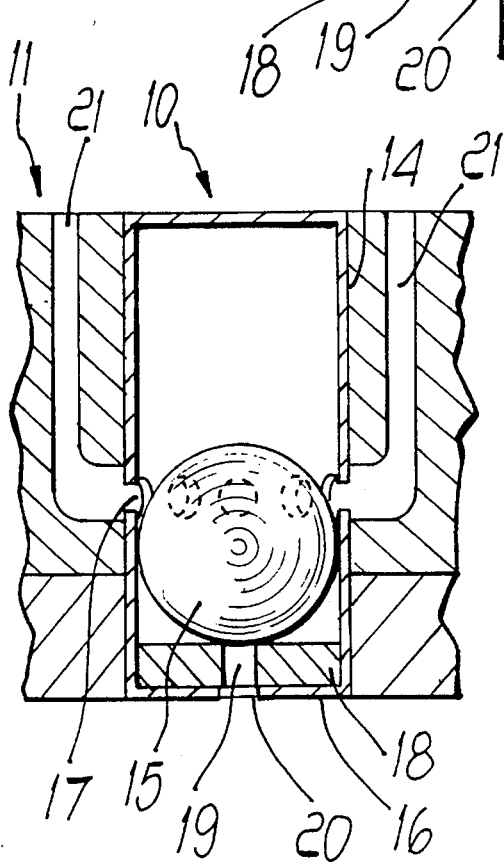
FIGS. 4 and 5 are sectional views of the device after installation, in the condition in which the internal pressure is in substantial equilibrium with the external pressure and, respectively, when overpressure occurs.
Figure 5:
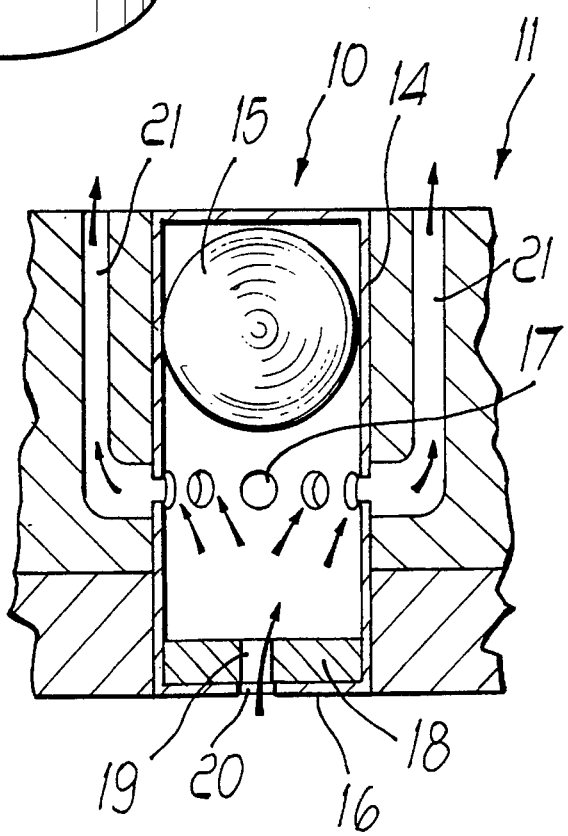

With reference to the above mentioned FIGS. 1 to 4, a pressure compensating device according to the invention is generally designated by the reference numeral 10; two devices are conveniently mounted within the perimetric structure 11 of an insulating glass frame 12, respectively in an upper region and in a lower region.

The device is embedded in the molecular sieve 13.

The device 10 comprises, in particular, a closed hollow cylindrical body 14 made of nonmagnetic material and arranged so that its axis is vertical.

A ball 15 made of magnetic or ferromagnetic material is movable within the body 14; its diameter is such that it is in contact with the wall, so as to fully separate the inside of the body 14 into two regions.

The ball 15 is carried by its own weight towards the bottom 16 of the hollow body 14.

In a suitable wall portion of the hollow body 14 there is a series of first co-planar holes 17 for connection to the outside for the body 14 located in an upward region and to the inside of the insulating glass frame for the body located in a downward region.

A disk-shaped magnet 18 is fixed to said bottom 16, and its diameter is practically the same as the inside diameter of the hollow body 14.

The magnet 18 and the bottom 16 are centrally crossed by respective second circular coaxial holes 19 and 20, the first whereof is normally closed by the ball 15.

The holes 19 and 20 connect the inside of the body 14 to the inside of the insulating glass frame, as regards the upper body, and to the outside, as regards the lower body, by means of ducts 21 which run within the perimetric structure 11 of the insulating glass frame.

As regards operation, in equilibrium conditions the ball 15 closes the hole 19 by virtue of its own weight and due to the attraction of the magnet 18, preventing the flow of air between the inside of the insulating glass frame 12 and the outside.

When a given threshold in pressure difference between the inside and the outside is exceeded, the overpressure region (the inside of the insulating glass frame for the upper body 14 and the outside for the lower body 14), by overcoming the attraction of the magnet 18 on the ball 15, lifts said ball and opens the holes 18 and 19.

In its motion, the ball 15 passes beyond the position of the holes 17, connecting the inside to the outside.

This restores the equilibrium conditions that make the ball fall back onto the holes 18 and 19, thus restoring the initial conditions.

At this point it should be noted that in other embodiments the two devices 10 might both be placed on the same side of the frame.

It should also be noted that air filters in input and in output to the insulating glass frame must be provided, for example in order to prevent moisture from entering.

Said filters can be provided for example by providing replaceable external cartridges or by providing inside the structure a perimetric labyrinth through which the air is conveyed.

Figure 7:
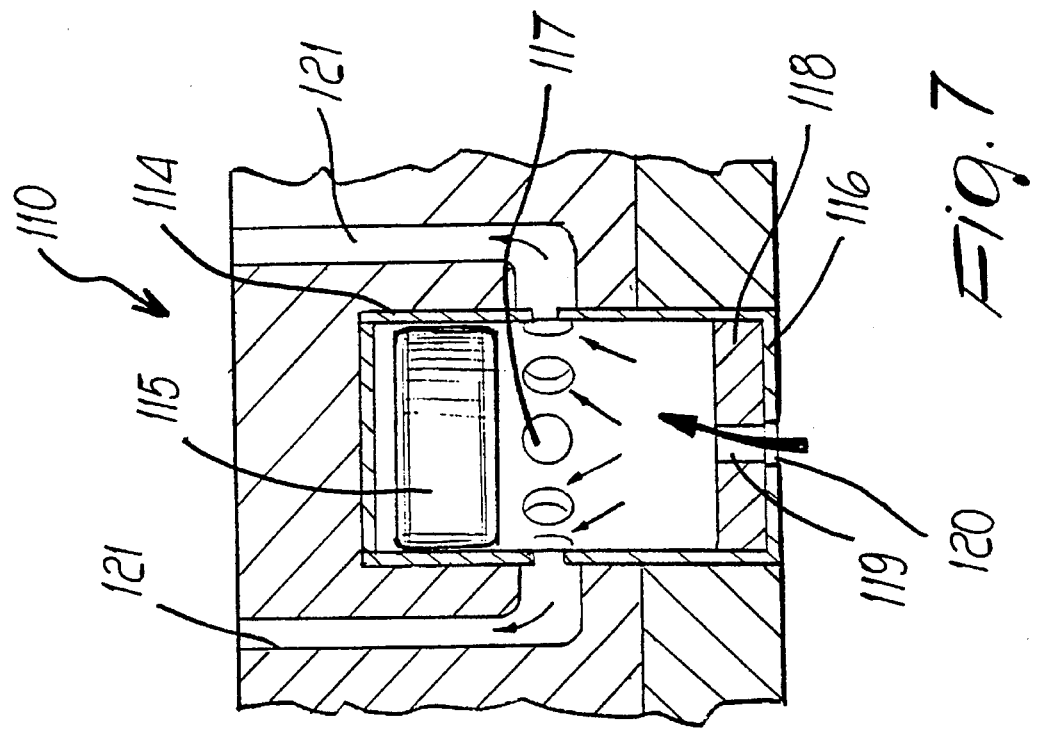
FIGS. 6 and 7 are sectional views of a further embodiment of the device after installation, in the condition in which the internal pressure is in substantial equilibrium with the external pressure and, respectively, when overpressure occurs.
Figure 6:
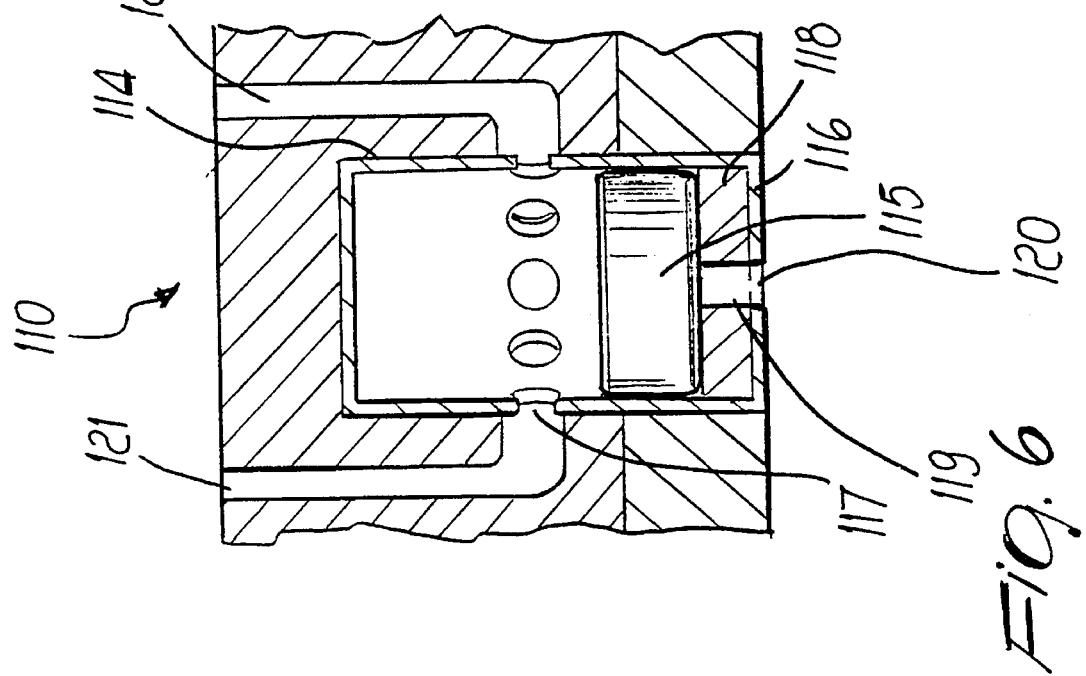

With particular reference now to the above mentioned FIGS. 6 and 7, the device, in a further embodiment, is generally designated by the reference numeral 110 and comprises, in particular, a closed hollow cylindrical body 114 made of nonmagnetic material which is arranged so that its axis is vertical.

A disk 115 made of magnetic or ferromagnetic material is movable within the body 114 and has such a diameter that it is in contact with the wall, so as to fully separate the inside into two regions.

The disk 15 is moved by its own weight towards the bottom 116 of the hollow body 114.

A series of first co-planar holes 117 is arranged in a suitable wall region of the hollow body 114; said holes provide a connection to the outside for the body 114 located upwardly and to the inside of the insulating glass frame for the body located downwardly (for an installation similar to the one shown in FIG. 1).

A disk-like magnet 118 is fixed to said bottom 116, and its diameter is substantially equal to the inside diameter of the hollow body 114.

The magnet 118 and the bottom 116 are crossed centrally by respective second circular coaxial holes 119 and 120, the first whereof is normally closed by the disk 115.

The holes 119 and 120 connect the inside of the body 114 to the inside of the insulating glass frame, as regards the upper body, and to the outside, as regards the lower body, by means of ducts 121 which run within the perimetric structure 111 of the insulating glass frame.

As regards operation, it is equivalent to the operation of the device 10.

In practice it has been observed that the intended aim and objects of the present invention have been achieved.

The invention thus conceived is susceptible of numerous modifications and variations, all of which are within the scope of the inventive concept.

All the details may furthermore be replaced with other technically equivalent elements.

In practice, the materials employed, so long as they are compatible with the contingent use, as well as the dimensions, may be any according to the requirements.

What is claimed is:

1. Device for automatically compensating pressure differences between the inside and the outside of an insulating glass frame caused by changes in environmental parameters, comprising a closed cylindrical hollow body which is arranged, so that its axis is not horizontal, between the inside and the outside of an insulating glass frame, a ball being movable within said body, said ball having such a diameter as to be in contact with the wall of the body so as to fully separate the inside of the body into two regions, at least one first hole for communication between the inside of said body and one of the inside and outside of the insulating glass frame being located in a suitable wall portion affected by the passage of said ball, at least one second hole for communication between the inside of said body and the other of said inside and outside of the insulating glass frame being located on the bottom of the body, and wherein the top of the body above said at least one first hole is completely sealed such that air is only able to pass through said at least one first hole through said body and through said at least one second hole.

2. Device according to claim 1, wherein said ball comprises material having magnetic or ferromagnetic characteristics and wherein a magnet is located on said bottom, said hollow body being made of diamagnetic material.

3. Device according to claim 2, wherein said magnet is disk-shaped and is crossed, together with said bottom, by a central hole that is closed by said ball in an equilibrium condition.

4. Device according to claim 3, wherein said magnet is snugly accommodated within said body.

5. Device according to claim 1, wherein said body is arranged so that its axis is vertical.

6. Device according to claim 1, further comprising a series of first holes which are arranged in a co-planar manner on said wall of said body.

7. Device for automatically compensating pressure differences between the inside and the outside of an insulating glass frame, comprising a closed elongated hollow body which is arranged so that its axis is not horizontal between the inside and the outside of an insulating glass frame, a flat element being movable in said body, the outer profile of said element being such as to make contact with the wall of the body so as to fully separate the inside of the body into two regions, at least one first hole for communication between the inside of said body and one of the inside and outside of the insulating glass frame being provided in a suitable wall portion affected by the passage of said flat element, at least one second hole for communication between the inside of said body and the other of said inside and outside of the insulating glass frame being placed on the bottom of the body, and wherein the top of the body above said at least one first hole is completely sealed such that air is only able to pass through said at least one first hole through said body and through said at least one second hole.

8. Device according to claim 1, further comprising, upstream or downstream of said hollow body, air filtering means which have a replaceable external cartridge or are permanently included in the internal structure of the insulating glass frame.

9. In an insulating glass structure comprising a perimetric frame structure and glass plate means connected to said perimetric frame structure such as to form an inner chamber substantially sealed from an environment which is external to said inner chamber, a pressure compensating system for compensating pressure differences between the inner chamber and the external environment comprising:

a first hollow body disposed in said frame structure;

a first duct structure connecting the inside of said first hollow body with said inner chamber;

a second duct structure connecting the inside of said first hollow body with the external environment;

a first sealing element for automatically compensating a first threshold pressure differential so as to allow air to enter the inner chamber from the external environment, said first sealing element sealingly engaging the inner surface of said first hollow body and being slidably accommodated inside said first hollow body so as to automatically seal communication between said first duct structure and said second duct structure when the difference between the pressure of the external environment and the pressure inside the inner chamber is less than said first threshold pressure differential and so as to automatically allow communication between said first duct structure and said second duct structure when the difference between the pressure of the external environment and the pressure inside the inner chamber is greater that said first threshold pressure differential;

a second hollow body disposed in said frame structure;

a first passage structure connecting the inside of said second hollow body with the external environment;

a second passage structure connecting the inside of said second hollow body with said inner chamber; and a second sealing element for automatically compensating a second threshold pressure differential so as to allow air to exit from the inner chamber into the external environment, said second sealing element sealingly engaging the inner surface of said second hollow body and being slidably accommodated inside said second hollow body so as to automatically seal communication between said first passage structure and said second passage structure when the difference between the pressure inside the inner chamber and the pressure of the external environment is less than said second threshold pressure differential and so as to automatically allow communication between said first passage structure and said second passage structure when the difference between the pressure inside the inner chamber and the pressure of the external environment is greater that said second threshold pressure differential.

10. The combination of claim 9 further comprising means for filtering air traveling through said first and second duct structures and through said first and second passage structures.

11. The combination of claim 9 wherein said first and second hollow bodies have substantially the same shape both with a first closed end and a second end provided with respectively said second duct structure and said second passage structure, and wherein said first and second hollow bodies each have a circumferential wall structure extending between said first and second ends and being provided with respectively said first duct structure and said first passage structure in an intermediate position of the wall structure.

12. The combination of claim 11 wherein said second duct structure and said second passage structure each comprise a central hole provided in the second end substantially coaxially with respect to the central axis of the circumferential wall and wherein said first duct structure and said first passage structure each comprise a series of coplanar holes provided circumferentially in said intermediate position about the wall structure.

13. The combination of claim 12 further comprising magnet means disposed inside each of said first and second hollow bodies at the respective second end for engagement with said first and second sealing elements, and wherein said first and second sealing elements are made of magnetic material and said hollow bodies are made of diamagnetic material.

\* \* \* \* \*